Jan. 10, 1939.    L. RIBE    2,143,798
CHANGE SPEED HUB FOR BICYCLES AND THE LIKE
Filed Dec. 20, 1937    2 Sheets-Sheet 2
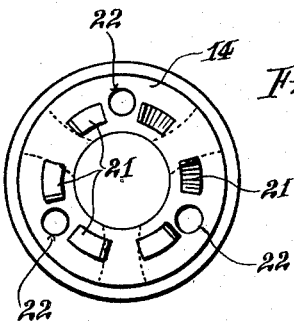
Fig. 6
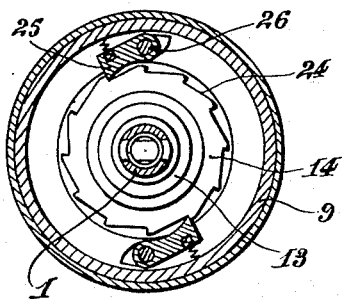
Fig. 2
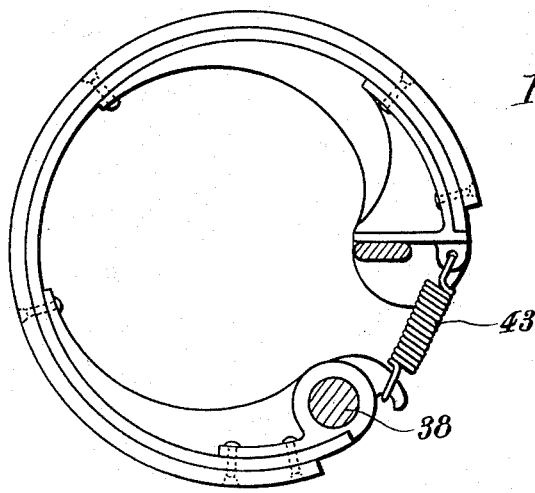
Fig. 9
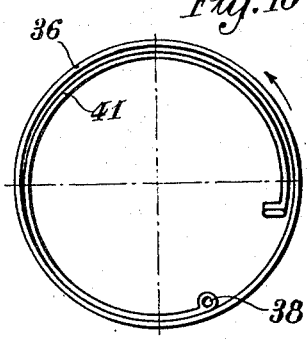
Fig. 10
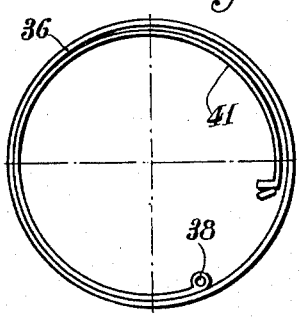
Fig. 11
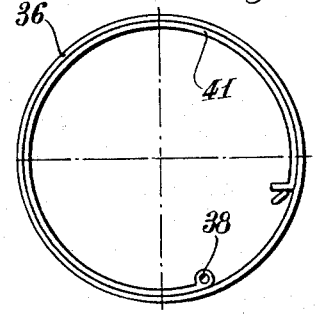
Fig. 12
INVENTOR:
Leon Ribe
By 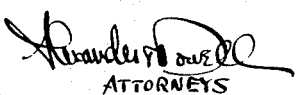
ATTORNEYS Patented Jan. 10, 1939

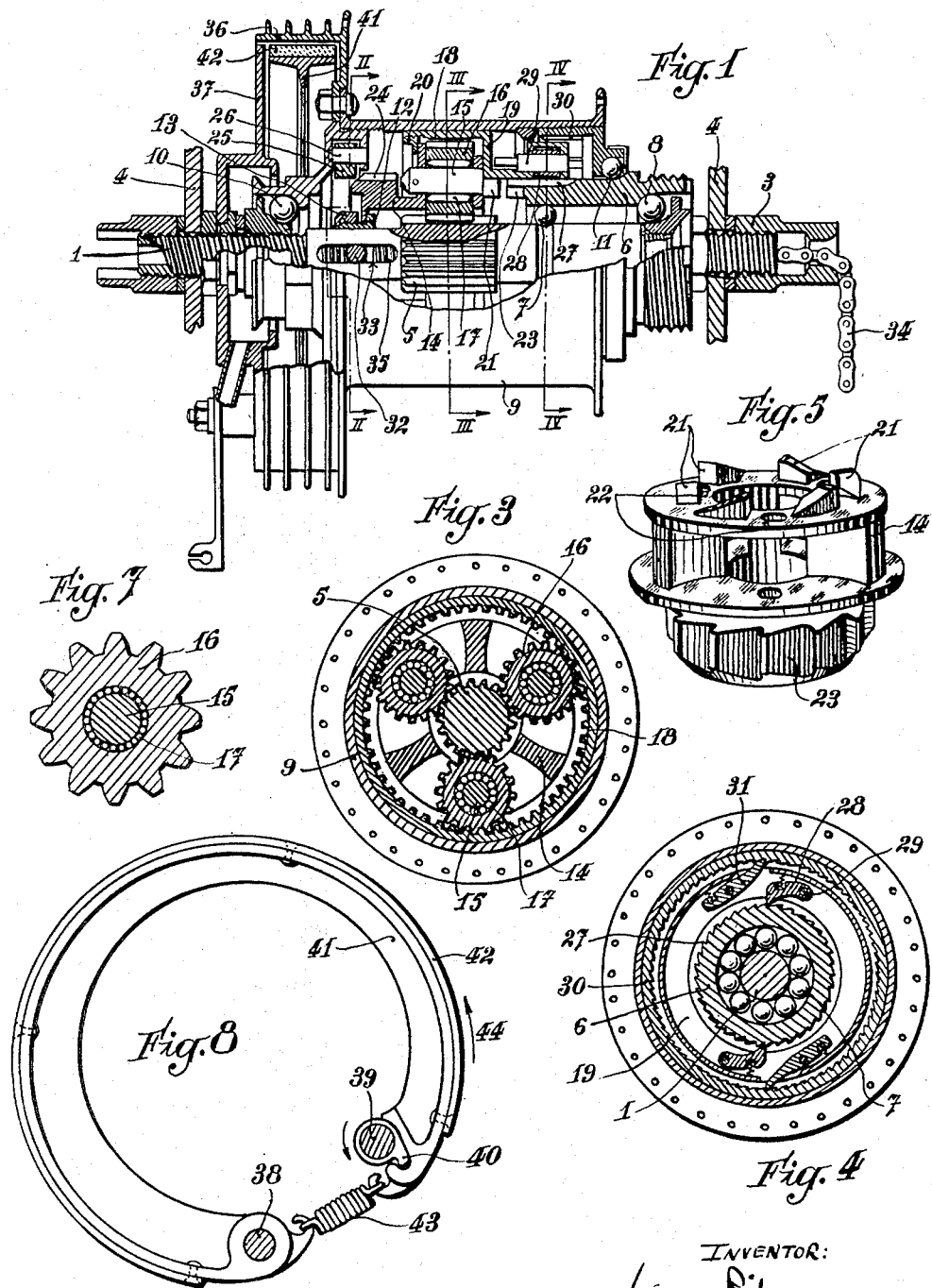

2,143,798

UNITED STATES PATENT OFFICE 2,143,798

CHANGE SPEED HUB FOR BICYCLES AND THE LIKE

Leon Ribe, Saint-Etienne, France, assignor to Albert Raimond, Saint - Etienne, (Loire), France Application December 20, 1937, Serial No. 180,868
In France December 19, 1936

1 Claim. (Cl. 74—280)

(Granted under the provisions of sec. 14, act of March 2, 1927; 357 O. G. 5)

This invention relates to change speed hubs for cycles of the type comprising an axially movable train of epicyclic gearing in continual engagement with a fixed central pinion, the said train being provided with ratchet teeth and pawls which co-operate with ratchet pawls and teeth provided on the hub proper and on the driving member to give three speed ratios according to the position of the train.

In the known constructions the epicyclic train comprises four planet gears with very fine gear teeth of a diametral pitch not exceeding 0.8, and four clutch teeth are laterally provided on the planet carrier to form the high-speed clutch, the shafts of the planet gears being located in the four spaces between the clutch teeth. This number of clutch teeth is practically insufficient. On the other hand the fine teeth of the planet gears are a serious drawback since they are liable to break in case of overload.

All the constructive characteristics of such gearings are dependent upon one another. If, for instance, the number of clutch teeth were to be increased the number of planet gears should also be modified since the planet shafts can only be located in the spaces between the successive clutch teeth. And if the number of planet gears were to be modified, the characteristics of their tooth-profile should also be changed. But in practice the depth of the teeth of the planet gears is limited by the necessity of leaving a sufficient thickness of material between the ball bearings supporting the planets and the roots of the teeth.

One object of this invention is to provide a change speed hub which will be able to transmit higher loads than in the known constructions without being heavier or more cumbersome.

A further object of this invention is to provide a change speed hub of the type above referred to, wherein the high speed clutch comprises six teeth instead of four.

Another object of the invention is to provide a change speed hub with only three planet gears having teeth of material thickness mounted on needle bearings.

Still a further object of the invention is to provide a change speed hub comprising in combination a brake ensuring a progressive and powerful braking action.

The invention will be hereafter described with reference to the drawings which illustrate by way of example one embodiment thereof.

Fig. 1 is a side view with parts in axial section of a hub according to this invention.

Figs. 2, 3 and 4 are cross-sections thereof taken along lines II—II, III—III and IV—IV of Fig. 1.

Fig. 5 is a perspective view of the planet carrier.

Fig. 6 is an end view thereof.

Fig. 7 is an enlarged cross section of a planet gear with its bearing and shaft.

Fig. 8 is a side view of the brake segment.

Fig. 9 illustrates a modification thereof.

Figs. 10 to 12 are diagrams explaining the operation of the improved brake segment.

Referring to Fig. 1, the improved change speed hub comprises as usual a shaft 1 fixed by nuts 2 and 3 to the cycle frame 4. Shaft 1 is integral with a fixed central pinion 5 and it rotatably supports a driving sleeve 6 mounted on balls 7 and 8, the said sleeve carrying the usual sprocket or sprockets.

The device comprises a hub casing 9 adapted to support the wheel in the usual manner; casing 9 is supported by balls 10 and 11 and is thus freely rotatable on shaft 1.

Shaft 1 slidably supports a ring 12 with counter-nut 13 which drives axially the planet carrier 14, the detail of which is clearly apparent from Fig. 5. This member carries three planet shafts 15 which support three planet gears 16 through needle bearings 17. As clearly shown, the planet gears 16 are in mesh with pinion 5 and with an internally toothed gear 18 supported by a carrier 19 rotatable on the planet carrier 14, but axially retained thereon by an end ring 20. Carrier 19 is in contact with the inner face of the hub casing 9.

The teeth of pinion 5, gears 16 and crown 18 are cut according to the stub system with a diametral pitch of 1.25 and an angle of pressure of 20°.

As shown in Figs. 5 and 6 the planet carrier 14 is provided with six concentric lateral clutch teeth 21 and the three holes 22 adapted to receive the planet shafts 15 are located in three of the six spaces between the successive clutch teeth 21. As shown in Fig. 1, these clutch teeth 21 are intended for co-operation with six corresponding clutch teeth 23 provided at the end of the driving sleeve 6.

The planet carrier 14 is provided at its end opposed to teeth 21, with a cylindrical ratchet gear 24 which, at the low speed position, co-operates with spring pressed pawls 25 pivoted on pivots 26 (Figs. 1 and 2). Sleeve 6 is also formed with a ratchet gear 27 (Figs. 1 and 4) which is in continual engagement with spring pressed pawls 28 carried on pivots 29 supported by an extension of carrier 19. The hub casing 9 has an internal ratchet gear 30 which co-operates, at the high and mean speed position, with spring pressed pawls 31 also pivotally carried by carrier 19 (Figs. 1 and 4).

Shaft 1 is hollow and houses the usual control means embodying a transverse pin 32 traversing an elongated opening 33 of shaft 1 and engaging recesses not shown in ring 12 in order to control the axial position of the same along shaft 1. Pin 32 is itself controlled by a chain 34 against the action of a spring 35.

Pinion 5, planet gears 16 and internally toothed gear 18 are cut according to the involute system with an angle of pressure of 20° and a diametral pitch not less than 1.25 (Fig. 7).

On the side of casing 9 there is fixed a brake drum 36 closed by an end plate 37 carried by shaft 1. Plate 37 carries a pivot 38 (Fig. 8) and a rotatable shaft 39 provided with an actuating nose 40. The latter is driven by any usual brake control means not shown. A brake segment 41, extending through more than three quarters of a circle, is freely pivoted on pivot 38 while its other end abuts against nose 40 under the action of a spring 42.

Segment 41 has a T-shaped cross-section, as clearly shown in Fig. 1 and it is provided with a friction lining 42.

When shaft 39 is operated, nose 40 at first applies against drum 36 the part of segment 41 nearest to pivot 38 (Fig. 10), segment 41 then operating as a rigid body. When the braking action is increased, segment 41 opens elastically substantially in its middle portion where the cross section is reduced and the area of pressure progressively extends from pivot 38 to the opposed end of segment 41 (Figs. 11 and 12).

In the modification of Fig. 9, the brake segment comprises an elastic ribbon 41a, for instance of steel, reinforced by two end members 41b of T cross-section.

Owing to the relative rigidity of the brake segment, no jamming can occur although the direction of rotation of the drum, as indicated by arrow 44, Fig. 8, is such that the frictional reaction tends to increase the pressure of the brake against the drum.

The hub casing is preferably extended through drum 36 by an extension 45 (Fig. 1) which terminates within an oil chamber 47 provided with an outflow 48. And to prevent oil from creeping along the periphery of extension 45 there is provided a projecting edge 46 around the end of the same.

It will be easily understood that the construction described is a marked improvement on the known constructions embodying four planet gears and only four clutch teeth on the planet carrier and on the driving sleeve. Owing to the use of needle bearings for the planet gears, the pitch of the teeth may be increased without unduly weakening the portion of the gear between the roots of the teeth and the inner bore of the gear; a diametral pitch of 1.25 is satisfactory in every respect. In the known arrangements, on the contrary, ball bearings are used for the planet gears and their diameter is such that the teeth must remain small, the diametral pitch being 0.8 or less.

I claim:

A change speed hub for cycles and the like, comprising in combination a fixed shaft carrying a central fixed pinion; a hub casing rotatable on said fixed shaft; three planet gears in slidable engagement with said central fixed pinion; a planet carrier rotatably and slidably supported by said fixed shaft and adapted to occupy positions corresponding respectively to high speed, mean speed, and low speed; the said carrier having six lateral clutch teeth; three planet shafts supported by said carrier, the said shafts being disposed in three of the six spaces between said clutch teeth; needle bearings interposed between each planet shaft and the corresponding planet gear; a driving member rotatably supported by said fixed shaft, said driving member having six lateral clutch teeth facing the six clutch teeth of said planet carrier and able to co-operate therewith; an internally toothed gear in mesh with said planet gears; a carrier for said internally toothed gear, said last-named carrier being rotatably supported by said planet carrier but axially retained thereon; means to clutch unidirectionally said planet carrier with said rotatable hub casing at the low speed position of the same on said fixed shaft; means to clutch unidirectionally said internally toothed gear carrier with said driving member at the mean and high speed positions; means to clutch unidirectionally said internally toothed gear carrier with said rotatable hub casing at the mean and high speed positions; and means to control the axial position of said planet carrier on said fixed shaft.

LEON RIBE.